April 29, 1924.
H. W. HUNT ET AL
1,492,069
TRANSMISSION MECHANISM FOR MACHINE TOOLS
Filed Aug. 8, 1921   8 Sheets-Sheet 5
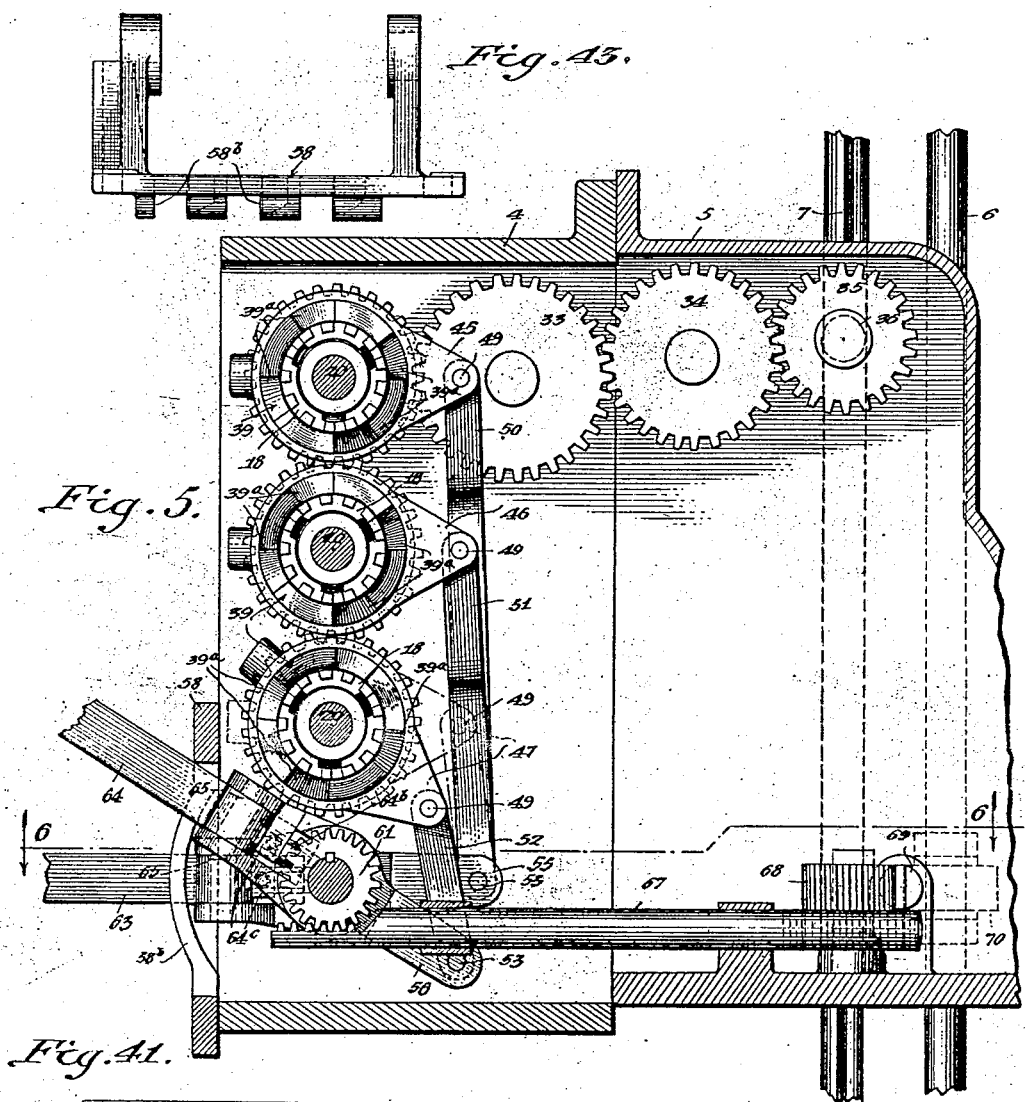
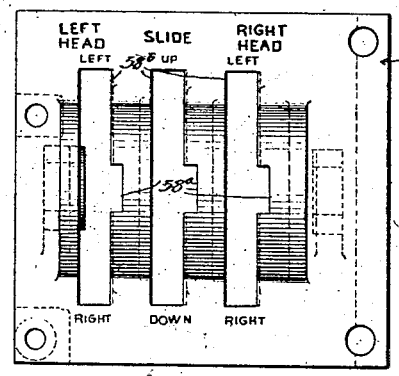
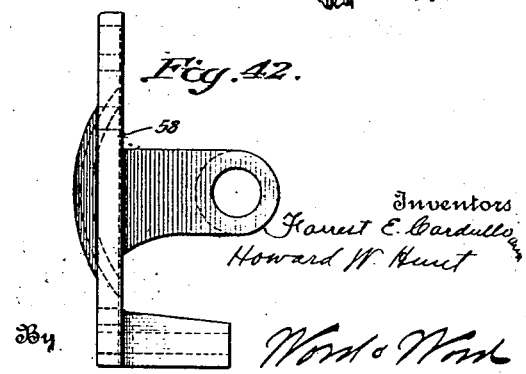

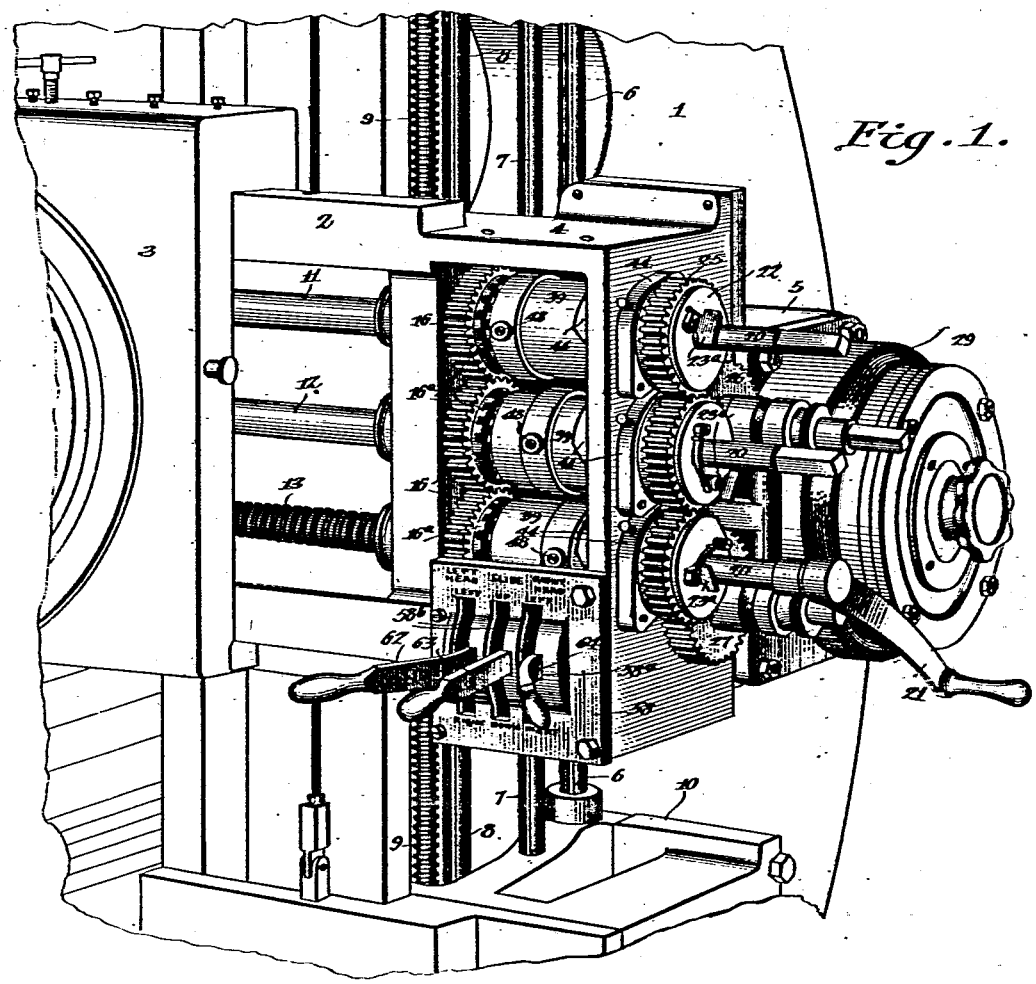

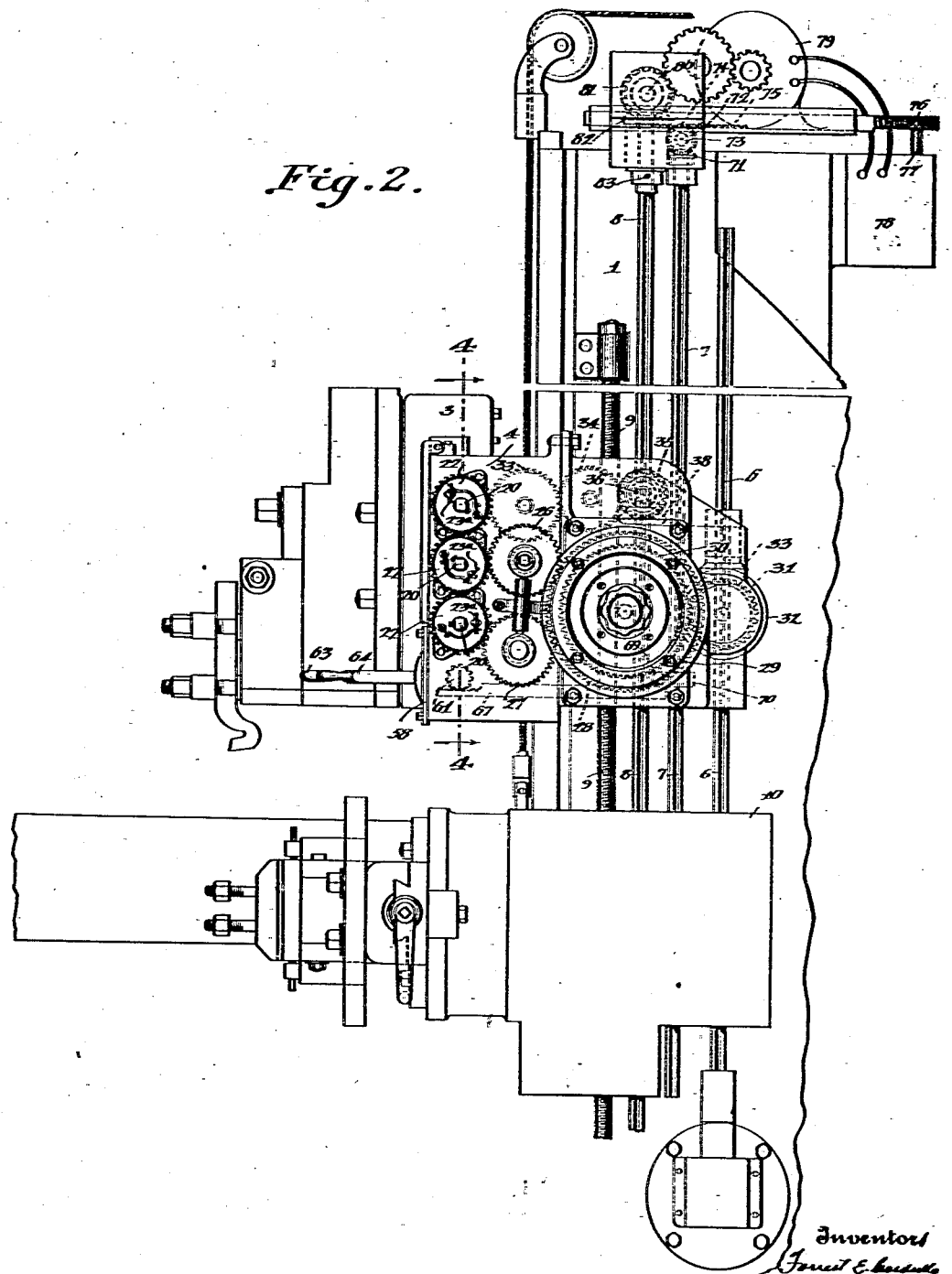

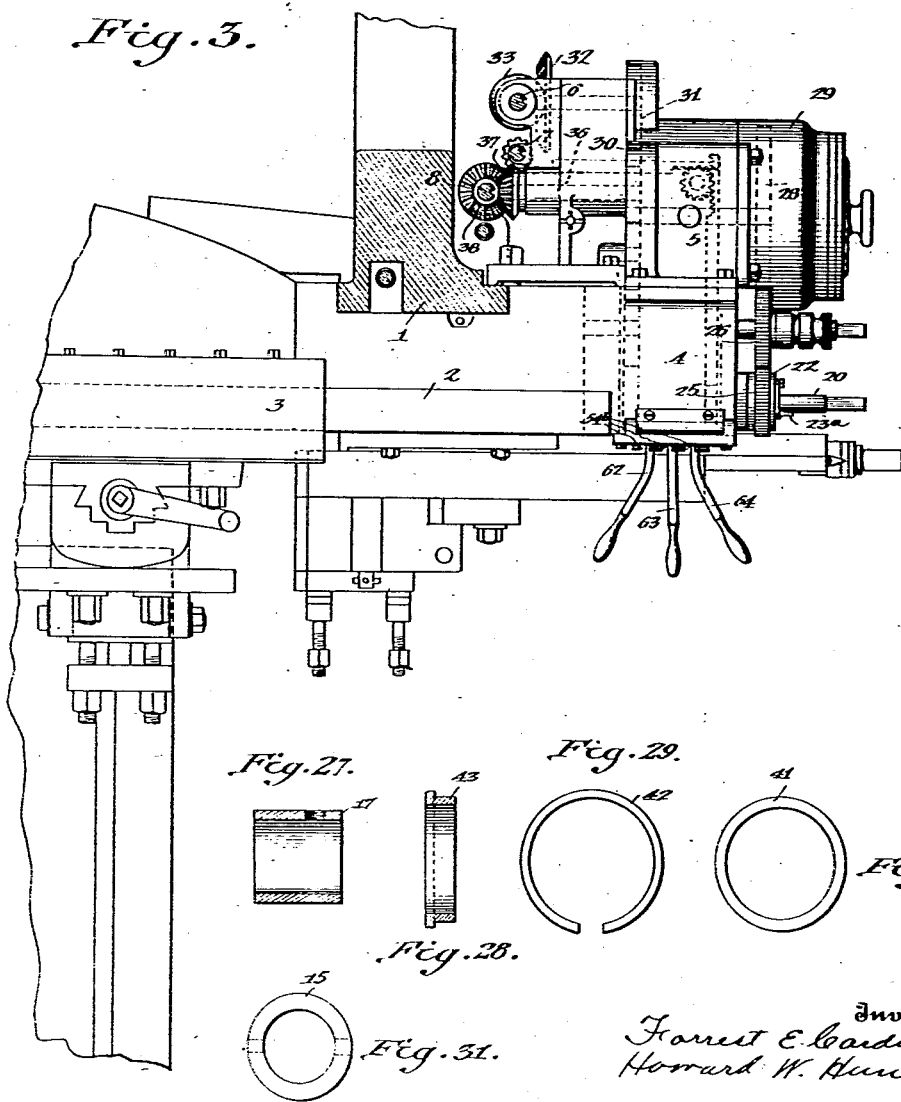

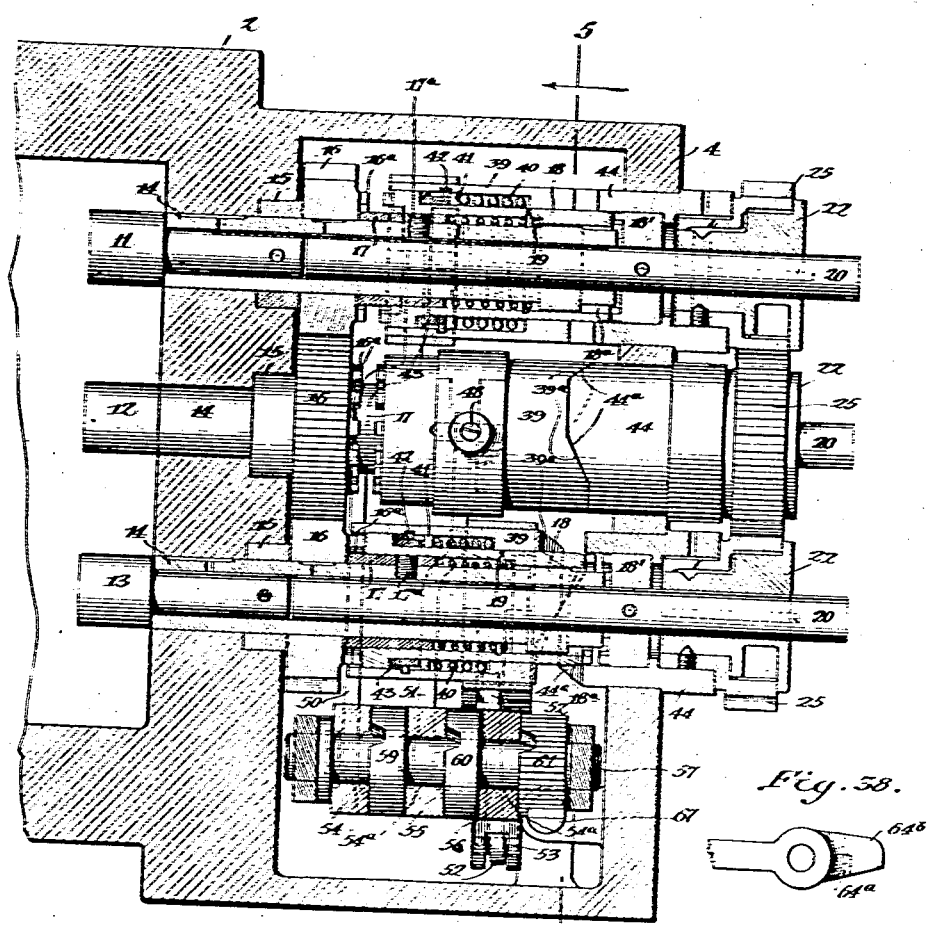

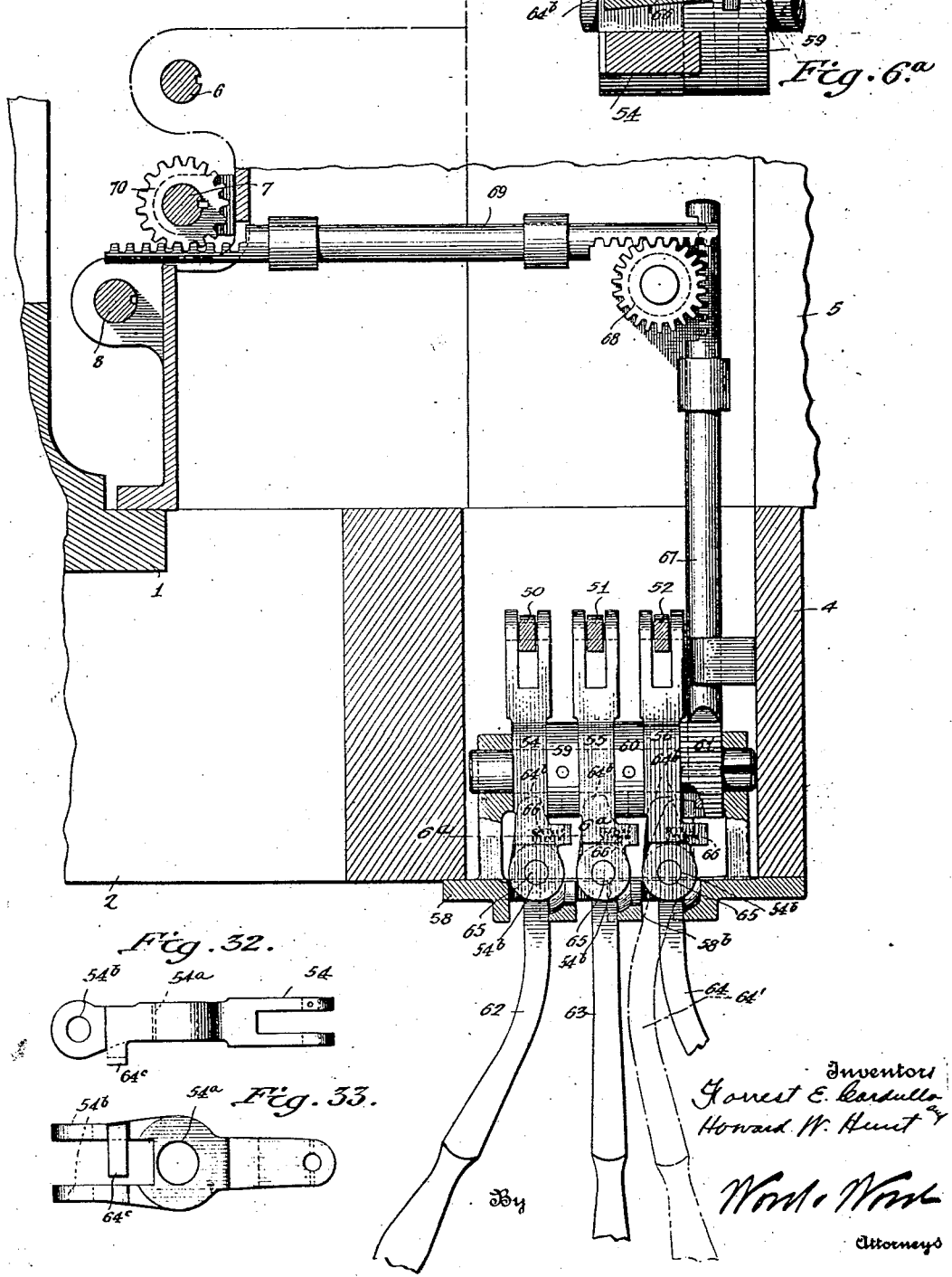

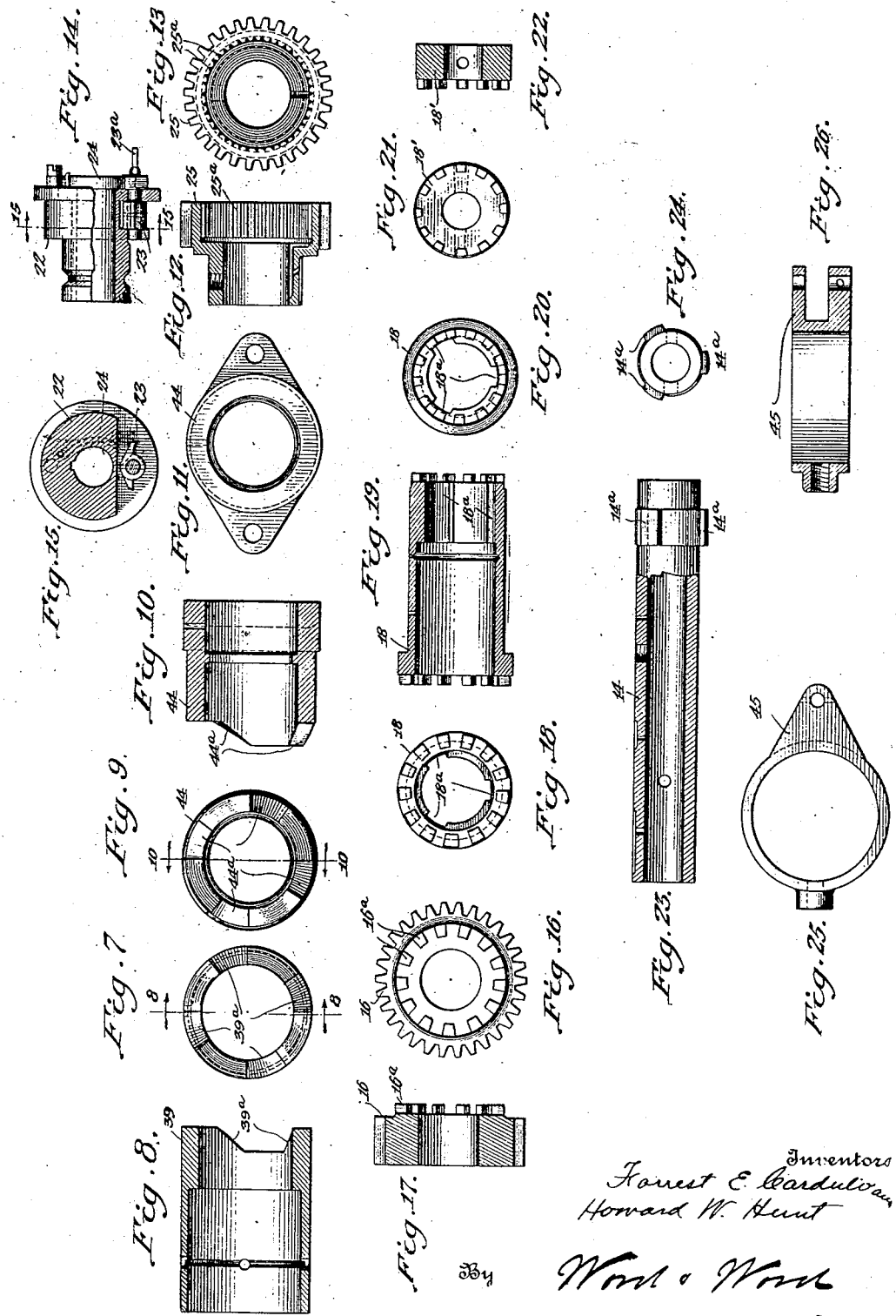

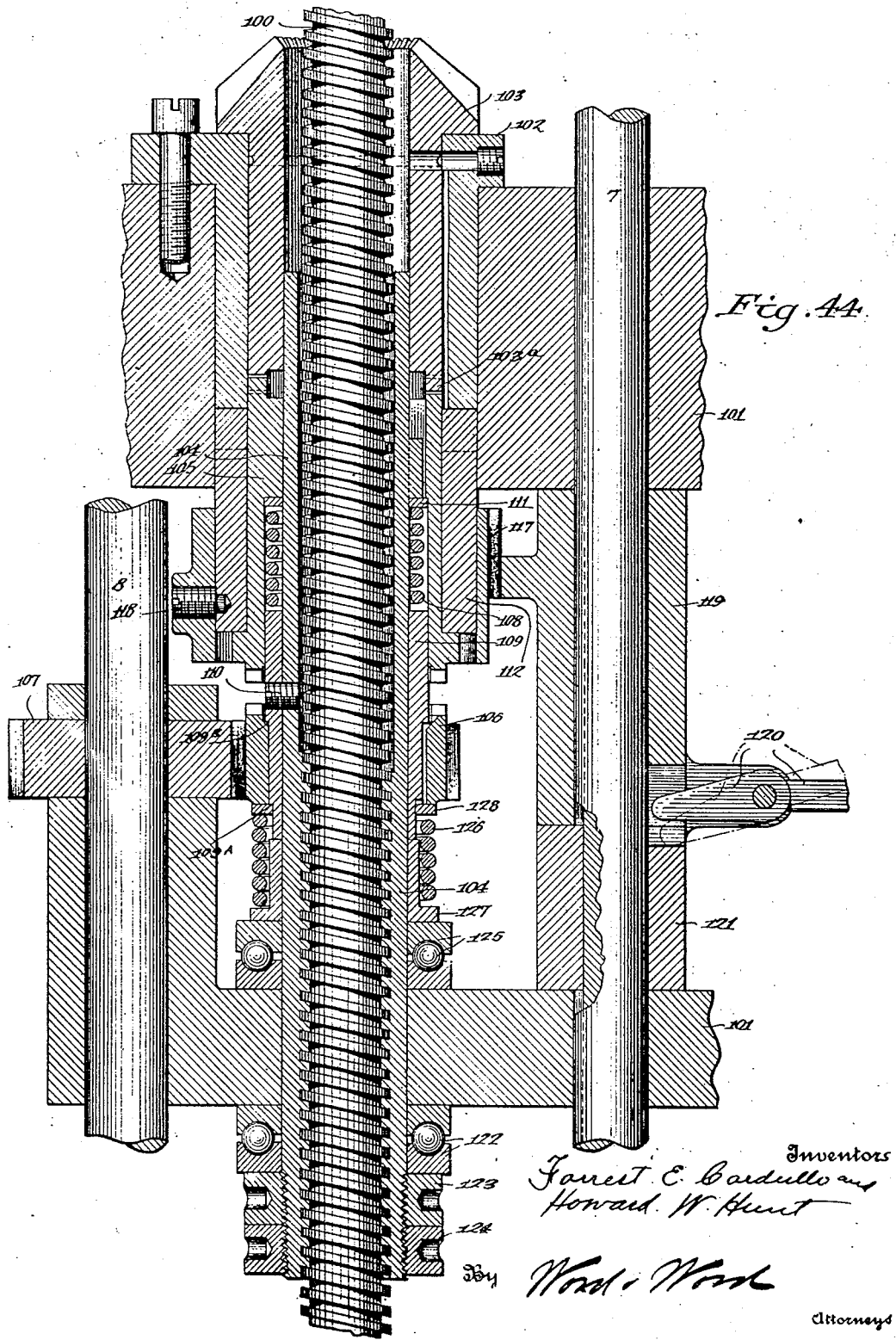

Patented Apr. 29, 1924.

1,492,069

UNITED STATES PATENT OFFICE.

HOWARD W. HUNT AND FORREST E. CARDULLO, OF CINCINNATI, OHIO, ASSIGNORS TO THE G. A. GRAY COMPANY, OF CINCINNATI, OHIO, A CORPORATION OF OHIO.

TRANSMISSION MECHANISM FOR MACHINE TOOLS.

Application filed August 8, 1921. Serial No. 490,453.

*To all whom it may concern:*

Be it known that we, HOWARD W. HUNT and FORREST E. CARDULLO, citizens of the United States, and residing at Cincinnati, in the county of Hamilton and State of Ohio, have invented a new and useful Improvement in Transmission Mechanism for Machine Tools, of which the following specification is a full disclosure.

This application relates particularly to power rapid traverse mechanism of a kind described in the application of Howard W. Hunt, Serial No. 336,077, filed November 6, 1919, and the present invention is subrogated thereto.

The purpose of this invention is to provide a compact, durable and readily assembled mechanism for controlling the transmission in any one of a plurality of directions, and as applied to a machine tool, for controlling the translation of one or more of the tool supporting members upon a support or rail.

With the invention exemplified as the transmission control of one or a plurality of tool holding heads of a planer, in which the head is translated upon a rail in opposite directions and the tool holder translated upon the head in opposite tool feeding directions, it is desirable to employ two different species of transmission, as a reversible direction constant rapid drive and an intermittent or slow feed drive, for the tool holding head and tool holder. The controlling or clutch mechanisms of the several transmission units are inter-related, whereby the one is locked out of control during the selected control of a second, to avoid injury to the mechanism.

The tool head of a planer is translated upon a cross rail by a screw shaft journaled upon the rail, the shaft for a rapid traverse of the head being driven by an electric motor or other form of drive susceptible to reverse direction control and may be termed a reversible high speed transmission, preferably for a return or non-working traverse of the head. The screw shaft for a slow or working traverse is rotated in either direction by transmission mechanism, imparting an intermittent rotation to the shaft which may be termed a slow feed transmission for the forward or working traverse of the head.

The tool holder or slide being translated by a screw upon the head, has the screw rotated by a shaft, which may be connected by means of a clutch with either the reversible high speed transmission or the intermittent slow speed transmission. The mechanism for operating the clutch for the tool holder translation is inter-related with the mechanism for operating the clutch for the head stock translation, to prevent throwing one clutch while a second is in commission. The clutch operating levers in connecting with the high speed transmission simultaneously control the rotation direction through movements of the levers in opposite directions from a neutral position, whereby the position of the lever may serve as an indicator for the direction of the head or slide translation.

In the accompanying drawings,

Figure 1 represents a perspective view of a portion of this mechanism applied to a planer, at the end of the cross rail.

Figure 2 is a fragmentary side elevation of a planer, showing the mechanism at the end of the rail and the shafts driving and controlling this mechanism.

Figure 3 is a fragmentary plan with the top brace and attached parts removed, showing the same parts as are shown in Figures 1 and 2.

Figure 4 is a longitudinal section through the mechanism mounted at the end of the rail on line 4, 4, Fig. 2.

Figure 5 is a transverse section showing the clutch operating mechanism mounted at the end of the rail, the section being taken on line 5, 5, Fig. 4.

Figure 6 is a horizontal section at the end of the rail showing the method of transmitting movement from the operating handles to a vertical control shaft, the section being taken on line 6, 6, Fig. 5.

Figure 6ª is a vertical section through an operating handle showing the spring which holds the operating handle in its proper position when it is not in use, and is taken on line 6ª, 6ª, Fig. 6.

Figure 7 is an end view of the rotatable cam which serves to move the clutches, showing the cam faces, and Figure 8 is a longitudinal section on line 8, 8, of this same cam.

Figure 9 is a view showing the inner end of the fixed cam against which the rotatable cam operates.

Figure 10 is a longitudinal section on line 10, 10, of the fixed cam, and Figure 11 is a view of the outer end of this cam.

Figure 12 is a longitudinal section of the click box gear, and Figure 13 is an end view of the click box gear.

Figure 14 is a partial longitudinal section of the pawl holder, pawl and spring of the click box, and Figure 15 is a transverse section of the pawl holder, pawl and spring on line 15, 15 of Fig. 14.

Figure 16 is an end view, and Figure 17 is a longitudinal section of the clutch gear.

Figure 18 is an end view, Figure 19 is a longitudinal section, and Figure 20 the opposite end view of a sliding clutch member.

Figure 21 is an end view, and Figure 22 is a longitudinal section of a clutch member fixed to the click box shaft.

Figure 23 is a partial longitudinal section, and Figure 24 an end view of a splined sleeve, which we call the clutch sleeve.

Figure 25 is an end view, and Figure 26 a section of the arm for operating the movable cam.

Figure 27 is a longitudinal section of a collar which is fastened upon the clutch sleeve.

Figure 28 is an axial section of a ring sliding within the movable clutch cam.

Figure 29 is a view of a split ring contained within the movable clutch cam.

Figure 30 is a view of a washer contained within the movable clutch cam.

Figure 31 is a view of a thrust collar pinned to the clutch sleeve.

Figure 32 is a plan view, and Figure 33 is a side view of a hub to which is pinned one of the operating handles.

Figure 34 is an end view, and Figure 35 a side view of a slotted collar, the slot of which engages a projection on the operating handle, and Figure 36 is an axial section of this collar.

Figure 37 is a face view of the rack gear upon the shaft carrying the slotted collar, shown in Figs. 34, 35 and 36.

Figure 38 is a fragmentary view, Figure 39 a fragmentary side view, and Figure 40 is an end view of one of the operating handles.

Figure 41 is a front view, Figure 42 is a side view, and Figure 43 is a plan view of the handle plate.

Figure 44 is a sectional view illustrating a modification.

Referring to Figure 1, 1 is the housing or side post on the operating or so-called right hand side of a planer or any similar machine tool, a similar post being employed at the opposite side. The posts upon their front face are provided with ways upon which the cross rail 2 is movable vertically and adapted to be clamped thereto. 3 is the right hand saddle, which moves horizontally upon the rail, and upon which a tool supporting member is mounted. A box or case 4 is cast or bolted on the end of the rail, and 5 is a second box which is bolted to the rail or to the box 4. 6 is a vertical shaft which rotates whenever the driving mechanism of the planer rotates. 7 is a vertical shaft which serves to control the power rapid traverse. 8 is a vertical shaft which serves to drive the power rapid traverse. 9 is a vertical fixed screw which supports a tool supporting member, called the side head.

Figure 1 discloses the upper portion of a side head 10, sliding vertically upon the face of the housing. The side head may be controlled similarly to but independently of the right and left heads on the cross rail, for a rapid and slow traverse of the side head upon the housing.

The cross rail has three shafts journaled therein, the shafts being parallel to each other and comprising a screw shaft 11, for moving the left hand saddle or tool carrying head (not shown) horizontally upon the rail. 12 is a shaft which moves a tool supporting member vertically upon a slide mounted upon either saddle. This shaft serves also for moving the tool supporting member vertically upon the slide of the right hand saddle traversing on the cross rail 2, and 13 is a screw which moves the right hand saddle 3 horizontally upon the rail.

Referring now to Fig. 4, screws 11 and 13 and shaft 12 will be seen to be journaled in the end of the rail 2. The ends of these screws and shaft are reduced in diameter to fit the bores of three corresponding clutch sleeves 14, 14, 14, which are pinned to 11, 12, and 13 respectively. To these clutch sleeves are pinned corresponding thrust collars 15, 15, 15, which prevent the screws, shaft and sleeves from moving to the left. Similar thrust collars are provided at the opposite end of the rail to prevent these parts from moving to the right. The collars, clutch sleeves, screws and shaft all turn freely in the rail. Each clutch sleeve 14 is provided with a gear 16, the gears meshing with one another and turning freely upon the sleeves. Clutch teeth, as shown at 16$^a$, are cut upon one side of each of these gears.

As the construction of the clutch mechanism for one shaft is the duplicate of the clutch mechanism for a second shaft a detailed description of the one is deemed sufficient.

The gear 16 is prevented from moving to the left by collar 15, and from moving to the right by a collar 17, fastened to the clutch sleeve 14 by a screw or screws, as shown at 17<sup>a</sup>.

The clutch sleeve 14, toward one end, upon its exterior surface, is provided with splines or keys 14<sup>a</sup> (see Fig. 24), cooperating with slots or key-ways 18<sup>a</sup> formed in the corresponding end of the clutch member 18, concentrically mounted upon the sleeve 14 and collar 17, and sliding longitudinally thereon. The key slots and the construction of the clutch member is clearly shown in Fig. 20. The splines of the sleeve 14 engage into the key slots, causing the clutch member and sleeve to rotate as a unit with the clutch member capable of being slid upon the sleeve. The clutch member 18 is counterbored to slide over the collar 17 and provides an annular pocket about the sleeve 14, for a spring 19 engaged between the end of the collar 17 and an annular internal shoulder of the clutch member 18. The spring forces the clutch member to the right to its full limit of movement and into engagement with a collar 18' fixed on the shaft 20. The clutch member 18 is provided with clutch teeth at its opposite ends for respectively engaging at one end with the clutch teeth of the collar 18' and at the opposite end with the clutch teeth formed on the side face of the gear 16, the clutch member being shifted upon the sleeve 14 for alternate engagement with the collar 18' and the gear 16.

The shaft 20 is a handle shaft, having a squared end for receiving a handle 21 for rotating the shaft manually. The handle shaft has pawl holder 22 pinned thereto, and the pawl holder is provided with a double ended pawl 23, shown in Figure 15, which is turned by means of a thumb stud 23<sup>a</sup> to which it is riveted, so that one end or the other engages notches 25<sup>a</sup>, shown in Fig. 13, cut on the interior cylindrical surface of click box gear 25. The pawl may also be turned into a neutral position, so that neither end engages the notches in the click box gear. The pawl spring 24 serves to hold the pawl in working engagement or neutral position, as may be desired. This click box construction is old and well known in the art. The three click box gears 25 respectively for intermittently rotating the shafts 11, 12, 13, intermesh, as shown in Figs. 1 and 2.

Referring now to Fig. 2, two idler gears 26, 27, are arranged so that the gear 26 may mesh with the middle click box gear, while gear 27 may mesh with the lower click box gear, gears 26, 27, being slidable axially, so that one or the other may be slid into the plane of the click box gears and so be made to mesh with its corresponding click box gear. These gears may also be made to mesh with gear 28, lying in the plane of the click box gears, and contained within the box or guard 29. Gear 28 rotates backward and forward through a limited arc as the planer operates, being driven by ratchet or frictional mechanism concentric with it and not shown.

This ratchet mechanism receives its motion from gear 30, which is driven by gear 31, which is fastened to bevel gear 32, which is driven by bevel gear 33, which is slidably keyed to shaft 6, and is turned first in one direction and then in the other by shaft 6, as the planer operates. It will be seen that the relative direction of motion of shaft 6, and of the click box gears may be altered by interposing gear 26 or 27 in the train between the click box gears and gear 28.

In the normal operating condition of the mechanism, gear 28 rotates alternately to the right and to the left, transmitting corresponding limited rotation first in one direction and then in the other to the several click box gears. The motion of these gears is transmitted by means of the pawls and pawl holders to the handle shafts; thence to the collars 18', to the clutches 18; to the clutch sleeves 14, and to the screws 11 and 13 and shaft 12. The motion transmitted to the screws and shaft is intermittent and not alternate since the click box gears can drive the pawl in one direction only, depending on the manner in which the pawl is set by the thumb stud. When the click box rotates in the opposite direction, the pawl, the pawl holder and its attached mechanism stand still. This mechanism will also stand still, irrespective of the alternate rotation of the click box gear, whenever the pawl is set in the neutral position. The intermittent rotation of the shaft and rod impart small intermittent motions to the tool supporting members for the purpose of feeding the tools. The feed mechanism is similar in design to mechanism already used for this purpose, and is described merely to make clear its relation to the power traverse mechanism, The upper of the three intermeshing clutch gears 16 meshes with idler gear 33, (see Figs. 2 and 3), which meshes with idler gear 34, which meshes with driving gear 35, which is keyed to the shaft 36, driven by bevel gear 37, which meshes with bevel gear 38 (see Fig. 3), which is slidably keyed to shaft 8, which may be made to revolve in either desired direction in a manner to be described later.

Referring again to Fig. 4, each clutch member 18 respectively is surrounded by a movable cylindrical cam 39. Within the movable cam 39, is a spring 40, which is maintained at a greater tension than spring 19. This spring presses against washer 41, which is prevented from moving to the left by split ring 42, contained in a groove cut in the internal cylindrical surface of cam 39. Abutting against washer 41, is sliding collar 43, which presses against a shoulder formed on clutch 18. The end of each movable cam is provided with four helical cam faces 39$^a$, fitting four corresponding helical cam faces 44$^a$, on a fixed cam 44.

Each fixed cam is provided with lugs or ears, so that it may be bolted to box 4. The interior cylindrical surface of cam 44 serves as a bearing for click box gear 25, and for clutch collar 18'.

Referring further to Fig. 4, it will be seen that when the upper movable cam 39 and clutch 18, concentric with screw 11, are in such positions, that the teeth at the right hand end of clutch 18 engage with the corresponding teeth on collar 18', cam 39 will be in such a position that the cam faces of 39 register with those of the fixed cam 44, in the same manner as is shown for those of cams 39 and 44, concentric with shaft 12. If, however, cam 39 be caused to rotate in either direction, the cam faces of 39 and 44 will move upon one another with a screw-like action, forcing cam 39 to the left, as is illustrated in the section of the cam and clutch concentric with screw 13. When the cam moves to the left, spring 19 will maintain washer 41 in contact with ring 42, holding collar 43 in contact with the shoulder of the sliding clutch 18, and push the clutch to the left, compressing spring 19. If the clutch gear 16 and the clutch 18 are in such relative position that the teeth will engage, this engagement will take place and clutch 18, sleeve 14, and the screw attached thereto, may be made to revolve by turning gear 16. In case, however, that the clutch 18 and gear 16 are in such relative position that the ends of the teeth strike and the teeth cannot engage, spring 40 will be compressed, as is shown in the case of the clutch mechanism concentric with screw 13. As soon as gear 16 commences to revolve, the clutch teeth will rotate into the meshing position, and spring 40 will instantly force clutch 18 to the left, causing the teeth of 18 to mesh with the teeth of 16, so that the sleeve 14 and its attached screw or shaft will be caused to rotate. Unless clutch 18 is forced over by cam 39 until the left hand teeth are in contact with the tops of the clutch teeth of gear 16, spring 40 will be held in partly compressed position by washer 41, and split ring 42, and will exert no pressure in opposition to spring 19. The relative tensions of the two springs are such that when spring 40 is in partly compressed condition, it is able to fully compress spring 19.

It will be noted that when this occurs, the teeth at the right hand end of clutch 18, which formerly meshed with clutch collar 18' are disengaged, so that the click box mechanism no longer rotates clutch 18 and its attached mechanism, and conversely is not rotated by clutch 18, when the clutch is rotated by the turning of gear 16.

If now cam 39 be rotated to its initial position, spring 19, which is now fully compressed, will force clutch 18 and cam 39 to the right, thus disengaging clutch 18 from clutch 16, and causing it to reengage with clutch collar 18'.

In order that the cylindrical movable cams may be turned when desired, each one is provided with an arm 45, 46, 47, respectively. These are so made that they may be fastened to their respective cams by set screws 48.

Each arm projects to the rear and is drilled to receive a pin 49, which fits loosely in the eye formed in the connecting rod. Arm 45 connects with rod 50, arm 46 with rod 51 and arm 47 with rod 52. These rods are provided with eyes at their lower end, in which pins 53 fit loosely. Pins 53 attach the rods to three hubs 54, 55 and 56, which are mounted upon a horizontal shaft 57, supported in bearings formed in the plate or casting 58, as shown in Figs. 41, 42 and 43. These three hubs turn loosely upon the shaft 57, which passes through holes bored in the hubs as at 54$^a$. At the right of each hub and between it and the next are slotted collars 59, 60, 61, each of which is pinned to the shaft 57.

Pinned to each hub by three identical pins 65, are handles 62, 63 and 64, so arranged that each handle may be moved through a small arc about the axis of pin 65, which fits in a hole bored in the hub as at 54$^b$.

Ordinarily, the part of the handle which projects from the hub lies in a corresponding notch 58$^a$, cut in plate 58, being held in that position by small spring 66, (see Fig. 6$^a$) interposed between the hub and the handle, and contained partly in a recess 64$^a$ drilled in the handle, and abutting the projection 64$^c$ formed integrally with the hub.

Referring to Fig. 6, if the outer end of one of the handles, say handle 64, be moved to the left, as, for instance, to the position 64', the handle will revolve about pin 65, compressing spring 66, and causing the inner end of the handle 64$^b$ to swing into such a position that it engages the slot in collar 61. The handle is now free to move vertically in slot 58$^b$ in plate 58, (see Fig. 41), and if it is moved it will cause the hub 56, collar 61 and shaft 57 to revolve. By means of pin 53, connecting rod 52 and pin 49, this movement will be transmitted to the arm 47, causing it and its attached movable cam to revolve, disengaging the clutch 18 from the feed, and engaging it with clutch gear 16 in the manner already described.

On the outer cylindrical surface of collar 61 are cut teeth adapted to mesh with corresponding teeth milled in rack 67, which is circular in section, except where the teeth are milled in it. The rotation of collar 61 causes rack 67 to be drawn forward (or in Fig. 5 to be drawn to the left) when handle 64 is raised in the position shown. Rack 67 is also provided with teeth at its opposite end, which mesh with gear 68, whose teeth in turn mesh with teeth cut at one end of rack 69. Rack 69 is also provided with teeth at its opposite end, which mesh with gear 70, which is slidably keyed to shaft 6.

It will be seen that drawing handle 64 from the notch 58<sup>A</sup> and raising it will cause rack 67 to come forward, causing gear 68 to rotate in a clockwise direction, causing rack 69 to move to the right and rotate gear 70, and shaft 7 in a counter-clockwise direction.

To the upper end of shaft 7, is keyed mitre gear 71, meshing with mitre gear 72 which is keyed to horizontal shaft 73. To horizontal shaft 73 is keyed spur gear 74 which meshes with rack 75. The other end of rack 75 is also provided with teeth which mesh with gear 76, which is keyed to shaft 77, which moves the electrical connections of motor controller 78, which may be of any suitable type.

The rotation of shaft 77 in one direction will cause electrical connections to be made which will energize motor 79, so as to cause it to revolve in a certain direction. The rotation of shaft 77 in the opposite direction will cause different electrical connections to be made, which will cause the motor to revolve in the opposite direction. Motor 79 is connected by suitable gearing to horizontal shaft 80, to which is keyed mitre gear 81, meshing with mitre gear 82, which is pinned by means of a small pin 83 to shaft 8. Pin 83 is so proportioned that its strength is sufficient to drive shaft 8 under all ordinary circumstances, but if any defect occurs in the operation of the mechanism which would cause damage in case too much power were applied, pin 83 will be sheared and the mechanism will not be damaged. The revolution of shaft 8 will be transmitted through bevel gears, 38, 37 and shaft 36, gears 35, 34 and 33 to the upper clutch gear 16, which in turn rotates the corresponding middle and lower clutch gears. Thus it will be seen that the raising handle 64 will not only uncouple clutch member 18 from clutch member 18' and cause it to engage with clutch gear 16, but will also cause clutch gear 16 to revolve, thus rotating shaft 13, causing the saddle or tool support to move longitudinally on the rail. Were the handle to be lowered from its middle position the motion transmitted by the racks 67 and 69 and gears 68, 70 to shaft 7 would have caused it to rotate in a clockwise direction, which in turn would have caused controller shaft 77 to rotate in a direction opposite to that previously described and energize the motor connections in such a manner as to cause the motor to rotate in an opposite direction to that previously described, which would also cause clutch gear 16 and screw 13 to revolve in a direction opposite to that previously described, and thus cause the saddle to move in a direction opposite to that previously described.

In case handle 63 has been moved instead of handle 64 shaft 57 would have been caused to rotate, thus establishing the desired motor connections and rotating in either desired direction the three clutch gears 16, 16 and 16. In this case, however, the connecting rod 51 would have caused arm 46 to rotate the middle one of the three clutch shifting cams and shaft 12 would have been caused to revolve instead of screw 13. In like manner had handle 62 been moved the three clutch gears would again have been caused to revolve in either desired direction, but the upper clutch would have been shifted by the action of connecting rod 50, and screw 11 would have been caused to revolve in either desired direction, thus moving the left hand saddle instead of the right hand saddle.

The following points may be noted in connection with the operation of this device:

The driving motor and the mechanism geared thereto ordinarily stands still.

When any of the handles are raised or lowered the driving motor is energized and all the gearing revolves.

When the handle is returned to its neutral position the controller automatically disconnects the motor and the gearing stops.

Each handle controls one clutch. The operation of any handle uncouples the corresponding screw or shaft from the feed mechanism and couples it to the power traverse mechanism. All other screws and shafts remain coupled to the feed mechanism and disconnected from the power traverse mechanism.

When any of the handles are in the neutral position (i. e., in one of the notches 58<sup>a</sup>) it is disconnected from its corresponding slotted collar, and shaft 57 may revolve in either direction without affecting the handle or the cam and clutch mechanism connected therewith.

When it is desirable that the clutch mechanism and operating handle shall move with the tool supporting member, I prefer to make use of the arrangement shown in Fig. 44, which shows the arrangement of mechanism employed in the side head previously mentioned.

In this arrangement, 100 is a fixed screw fastened at either end to the housing or side post of the planer, 7 is a vertical shaft previously described, 8 is a vertical shaft previously described, and 101 is the casting which forms the body or frame of the side head. Mounted in this casting is a bush 102 concentric with the fixed screw 100 and having cammed faces at its lower end. This bush is similar, in a general way, to bush 44 previously described. Revolving within this bush is bevel gear 103 which is revolvable by a similar bevel gear transmissively connected with the feed mechanism of the side head, and with a handle shaft which can be rotated manually, neither of which is shown. The lower end of bevel gear 103 is provided with clutch teeth 103<sup>A</sup>, similar in function to the clutch teeth already described in connection with clutch part 16. Concentric with screw 100 is nut 104, internally threaded to turn upon the screw and externally provided with splines, as in the case of the clutch sleeve 14 previously described. Splined to this nut is clutch member 105, having teeth cut at either end as in the case of clutch 18 previously described. Clutch member 105 is slidable axially upon the nut, so that it may engage the clutch teeth cut in bevel gear 103 or similar clutch teeth cut in gear 106 which is co-axial with and revolves freely upon the nut and screw. Gear 106 is rotated by gear 107 which is slidably keyed to shaft 8. Clutch member 105 is normally held in engagement with bevel gear 103 by means of spring 108, one end of which presses against sleeve 109 fastened to nut 104 by set screw 110. The upper end of spring 108 presses against washer 111, which in turn presses against the ends of the internal keys cut in the clutch member 105.

Concentric with clutch member 105 is clutch shifting cam 112 similar, in a general way, to cam 39 previously described, and provided with cammed faces cooperating with the cammed faces of bush 102. To the outside of the clutch shifting cam is fixed a sector 117 by means of set screw 118. This sector meshes with teeth cut in hub 119 to which is pivoted handle 120. This handle is similar to handle 63 previously described, and one end of it engages with a slotted collar 121 slidably keyed to control shaft 7. The weight of the side head is transmitted by frame 101 to ball bearings 122; thence to nut 123 and lock nut 124, screwed on the lower end of nut 104, whence the thrust is taken by the threads of the screw 100. Side heads are usually counterweighted. In case the weight of the counterweight is greater than that of the side head, frame 101 pushes upward against ball bearing 125, when the upward thrust is transmitted to collar 109; thence to nut 104 and screw 100. Instead of placing a second spring within the clutch shifting cam as 40, shown in Fig. 4, the alternative construction shown in Fig. 44 may be employed. Gear 106 not only turns freely upon the exterior cylindrical surface of collar 109, but is slidable axially thereon. It is normally held in the position shown by spring 126, one end of which presses against collar 127 resting on ball bearing 125, while the other end presses against washer 128. Washer 128 is restrained from moving upward by shoulder 109<sup>A</sup> cut on collar 109 so that gear 106 turns freely between washer 128 and shoulder 109<sup>B</sup>.

The operation of the mechanism is as follows:

Normally the mechanism is in the position shown, bevel gear 103 being rotated intermittently by the side head feed, or manually by crank, not shown. In case any other portion of the power traverse mechanism is operated, as, for instance, one of the parts previously described, shaft 8, gear 107 and gear 106 will rotate, but no other part of the side head will be caused to move. In case, however, that the outer end of handle 120 is raised so that the handle has the position shown in dotted lines, and then the handle be caused to rotate for a suitable distance about shaft 7, shaft 7 will be caused to rotate, since the end of the handle engages the slot in collar 121 which is slidably keyed to shaft 7. The rotation of shaft 7 will actuate the controller previously described, and shaft 8 will be rotated by the motor. Furthermore, hub 119 will simultaneously rotate with handle 120, which in turn will cause sector 117 and clutch shifting cam 112 to rotate. The action of the cammed faces of 112 upon those of 102 will cause the clutch shifting cam to move downward, pushing clutch 105 downward, withdrawing it from engagement with the clutch teeth of 103 and forcing it into engagement with clutch teeth of 106. In case the tips of the teeth of clutch 105 strike upon the tips of the clutch teeth of gear 106, gear 106 will be forced downward against the pressure of spring 126. As soon, however, as gear 106 rotates sufficiently so that the clutch teeth may enter into engagement, spring 126 will force gear 106 upward, causing it to drive clutch 105 and thus turn nut 104. When handle 120 is returned to its initial position, clutch shifting cam 112 will be rotated to its initial position, allowing spring 108 to shift it axially until the upper clutch teeth of 105 are in engagement with the clutch teeth of 103.

It may be noted that in the mechanism previously described in Fig. 4 as applicable to the rail, spring 40, and rings 41, 42 and 43 can be omitted and gear 16 may be altered and provided with a spring so that the action of the parts will be similar to that of gear 106, washer 128 and spring 126.

It will be noted that control shaft 7 is rotated in one direction when the operator pulls handle 120 towards him, and in the opposite direction when he pushes handle 120 away from him. In one case, shaft 8 will revolve in a clockwise direction, and in the other case it will revolve in a counter-clockwise direction by the action of the controller upon the motor, or other source of power. In case shaft 8 revolves in a clockwise direction when viewed from above, gear 106 and nut 104 will revolve in a counter-clockwise direction when viewed from above, and the side head will move downward if a left hand screw is used, as shown. In case the direction of rotation of shaft 8 be counter-clockwise, the side head will move upward.

Having described our invention, we claim:

1. In a mechanism of the class described, a plurality of shafts, a plurality of slidable clutch members, one splined to each shaft, a plurality of clutch shifting members one for each slidable clutch member, a plurality of clutches driven by a first source of power, one concentric with each shaft, a plurality of clutches driven by a second source of power, one concentric with each shaft, a controller for controlling the first source of power, transmission means for transmitting motion to the said controller, and a plurality of manually operated members, one for each clutch shifting member, and permanently connected therewith, and each selectively connectible with the said transmission means, for simultaneous and selective controller and clutch actuation.

2. In a mechanism of the class described, a controller, a shaft transmittingly connected with said controller for controlling operation, a plurality of clutch controlling levers, clutches respectively actuatable by said levers, said levers adapted to be selectively connected to said shaft for controller actuation with each respective clutch controller.

3. In a mechanism of the class described, a controller, a shaft transmittingly connected with said controller for controller operation, a plurality of clutch controlling levers, clutches respectively actuatable by said levers, said levers selectively adapted to be respectively connected and disconnected from said shaft by movement transversely to its clutch controlling motion for simultaneous clutch and control operation, adapting said clutch lever to operate its clutch and controller.

4. In a mechanism of the class described, a controller for transmission starting and reversing control, a shaft transmittingly connecting with said controller for controller operation, a plurality of levers respectively for operating independent transmission controlling mechanism adapted to be connected selectively with said shaft, adapting each lever to simultaneously operate its transmission controlling mechanism and said controller.

5. In a mechanism of the class described, a controller, a shaft adapted to operate a controller, a plurality of collars each having an indentation relatively in alignment, and fixed to said shaft, a plurality of members, one for each collar, loose upon said shaft, a plurality of handles, one pivoted to each member and each adapted by swinging to engage the indentation in its corresponding collar, a plurality of connections, one pinned loosely to each of the said members, a plurality of clutch shifting members, each provided with a lateral extension, one pinned to each of the respective connections; each of the said handles being adapted by swinging to engage its corresponding collar, and by movement in a direction at right angles to the swinging to simultaneously rotate the shaft and the corresponding clutch shifting member.

6. In a mechanism of the class described, transmission means for transmitting motion to a controller, a power means controlled by said controller for rotating a clutch, a second independent power means for rotating a second clutch, a clutch member adapted to engage alternately the first or the second of the said clutches, a clutch shifting member adapted by rotation to shift the said clutch member from engagement with the second clutch into engagement with the first clutch, a manually operated handle adapted to engage said transmission mechanism for transmitting motion to the controller, normally not engaging said transmission mechanism, and connections from said handle to said clutch shifting member for simultaneous clutch shifting and controller actuation.

7. In a mechanism of the class described, a driven shaft, a gear loose on said shaft, a clutch member movable for connecting said gear and shaft, a reversible rotating electric motor in transmission with said gear, said motor having a reversing direction controller, a clutch shifting member translatable in clutch shifting directions by rotative control and yieldingly connecting with said clutch member, a lever for operating said electric motor controllably movable in opposite directions from a neutral position for selective and indicative motor direction control and for rotating said clutch shift member.

8. In a mechanism of the class described, a driven shaft, a gear loose on said shaft, a clutch member movable for connecting said gear and shaft, a reverse rotating electric motor in transmission with said gear, said motor having a reverse direction controller, a clutch shifting member translatable in a clutch shifting direction by a rotative control for actuating said clutch member, a lever for operating said electric motor controllably movable in opposite directions from a neutral position for selective and indicative motor direction control and for rotating said clutch shift member.

9. In a mechanism of the class described, a plurality of driven shafts, each having a gear loose thereon and the gears relatively in a serial order transmittively engaged, clutch members respectively for connecting said gear and shaft, a reverse rotating electric motor in transmission with said gears, said motor having a reverse direction controller, a clutch shifting member for each clutch member translatable in a clutch shifting direction by a rotative control and yieldingly connecting with said clutch member, a lever for each clutch member, the levers of the unit common for operating said electric motor controllable and movable in opposite directions from a neutral position for selective and indicative motor direction controls, and for rotating said clutch shift member, and interlocking means for said levers for locking non-selected levers in their neutral position during the control of a selected lever.

In witness whereof, we hereunto subscribe our names, as attested by the two subscribing witnesses.

FORREST E. CARDULLO.
HOWARD W. HUNT.

Witnesses:
L. A. BECK,
N. M. SCHMIDT.